United States Patent
Fritz et al.

(10) Patent No.: US 11,313,416 B2
(45) Date of Patent: Apr. 26, 2022

(54) ASSEMBLY TOOL AND METHOD FOR MOUNTING A BEARING

(71) Applicant: AKTIEBOLAGET SKF, Gothenburg (SE)

(72) Inventors: Dominik Fritz, Würzburg (DE); Michael Reugels, Knetzgau (DE); Jesko-Henning Tanke, Schweinfurt (DE); Thomas Zika, Haag (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/030,641

(22) Filed: Sep. 24, 2020

(65) Prior Publication Data
US 2021/0095723 A1   Apr. 1, 2021

(30) Foreign Application Priority Data
Sep. 30, 2019   (DE) .......................... 102019214952.9

(51) Int. Cl.
*F16C 43/06*   (2006.01)
*B23P 15/00*   (2006.01)
*F16C 19/38*   (2006.01)

(52) U.S. Cl.
CPC .......... *F16C 43/065* (2013.01); *B23P 15/003* (2013.01); *F16C 19/383* (2013.01); *F16C 2360/23* (2013.01)

(58) Field of Classification Search
CPC .. F16C 43/065; F16C 19/383; F16C 2360/23; F16C 2300/14; F16C 2360/31; F16C 43/06; F16C 41/045; F16C 19/364; B23P 15/003
See application file for complete search history.

(56) References Cited

U.S. PATENT DOCUMENTS 4,582,436 A * 4/1986 Merron ................... E02F 9/121
                                                         384/593
2010/0215297 A1   8/2010 Messerschmidt et al.

FOREIGN PATENT DOCUMENTS

| DE | 102014205190 A1 | 9/2015 |
| JP | 2009185925 A | 8/2009 |
| WO | 2015108132 A1 | 7/2015 |

OTHER PUBLICATIONS

European Search Report from the European Patent Office dated Nov. 24, 2020 in related application No. EP 20 19 6126, including European Search Opinion.

* cited by examiner

*Primary Examiner* — Rick K Chang
(74) *Attorney, Agent, or Firm* — J-Tek Law PLLC; Scott T. Wakeman; Mark A. Ussai (57) ABSTRACT

An assembly tool for a bearing ring having roller members, the tool including a ring configured to be arranged on a side face of the bearing ring and including sliding elements received in receiving members on the ring. The sliding elements are distributed peripherally in a uniform manner around the ring and are configured to be displaced from a starting position into an end position relative to the ring. When the tool is mounted on the ring, the sliding elements, positioned in their end positions, extend between adjacent roller members and limit a radial movability of the roller members relative to the bearing ring.

19 Claims, 6 Drawing Sheets

ASSEMBLY TOOL AND METHOD FOR MOUNTING A BEARING

CROSS-REFERENCE

This application claims priority to German patent application no. 10 2019 214 952.9 filed on Sep. 30, 2019, the contents of which are fully incorporated herein by reference.

TECHNOLOGICAL FIELD

The present disclosure is directed to an assembly tool for mounting a bearing ring having roller members and to a method for mounting a bearing having an inner ring and an outer ring and to a bearing having an inner ring and an outer ring and to a hub unit for a turbine having two tapered roller bearings.

BACKGROUND

For tapered roller bearing arrangements in turbines, for example, for supporting a main shaft of a wind turbine, tapered roller bearings with single-piece cages are currently used. In turbine applications where the tapered roller bearings are used in an O-configuration and have a diameter of several meters, it is not possible, as a result of the size of the turbines, to rotate them for assembly of the second tapered roller set of the O-configuration. Therefore, the tapered roller bearing which is at the top in the end arrangement was previously provided with a cage so that the outer ring can first be assembled and then the inner ring with the roller members, which are retained by means of the cage, can be inserted with the narrow diameter at the bottom. With this upside-down assembly, however, the use of single-piece bearing cages is essential since the roller members without such a bearing cage or with bearing cages which comprise individual cage pocket segments would fall out during assembly.

The single-piece cages in contrast ensure a self-retention function of the tapered rollers during the assembly and thus enable an inner ring with a tapered roller set to be able to be assembled in an upturned position. However, these solid cages are very expensive to produce and often require additional elements on the bearing inner ring, such as, for example, a specific surface topography of the guiding faces, which results in additional costs. Furthermore, the guiding of a cage on the inner ring or the tapered rollers may be subjected to a sliding contact which can increase the wear of the bearing.

SUMMARY

An aspect of the present disclosure is therefore to allow for the use of bearings for such a turbine application with cage segments or to produce the bearings as full type roller bearings.

The assembly tool for mounting a bearing ring having roller members has a ring which is configured to be arranged on a side face of the bearing ring. The bearing ring may be a bearing inner ring or a bearing outer ring. The ring of the assembly tool may be constructed in an integral or segmented manner.

The assembly tool further has sliding elements, wherein the sliding elements are distributed peripherally in a uniform manner around the ring. The ring has receiving members for the sliding elements. The sliding elements may in this instance be displaced in an axial direction with respect to the ring and/or a radial direction relative to the ring. The number of sliding elements may be equal to the number of roller members. Alternatively, fewer sliding elements than roller members may also be provided. In both cases, all or only a portion of the sliding elements, for example, every second one, may be displaced into the end position.

The receiving members may be produced in any manner, for example, as through-openings such as bores, milled holes or other production types. The sliding elements can be displaced from a starting position, in which the assembly tool can be moved and the sliding elements are not displaced relative to the ring, into an end position, wherein the sliding elements in the end position are displaced completely relative to the ring, for example, are pushed completely through through-openings.

Generally, a bearing with a mounted outer and inner ring and roller members arranged therebetween is provided. In order to mount the bearing, the assembly tool is placed on the bearing ring (in particular, the large diameter of an inner ring) and the sliding elements are displaced into the end position thereof. The bearing ring can now be lifted with the assembly tool and the roller members from the bearing and the two rings can be mounted separately from each other.

Alternatively, the assembly tool can be placed on the bearing ring (in particular, the large diameter of an inner ring) and the bearing ring can be individually provided with roller members or a combination of roller members and cage segments and the sliding elements can be displaced gradually into the end position thereof.

In both cases, using the assembly tool there is formed from the bearing ring with the roller members an arrangement which can be moved as a whole, in particular placed on a hub unit, without the roller members falling from the bearing ring. To this end, the sliding elements are constructed to be arranged in the end position in each case between two roller members. As a result of this arrangement of the sliding elements, a radial movability of the roller members with respect to the bearing ring can be limited. In this case, the sliding elements take on the function of a bearing cage so that the roller members are secured between the sliding elements and the bearing ring. The use of a one-piece bearing cage can consequently be dispensed with. Instead, the bearing can be constructed to be of the full roller type, or individual cage segments may be used. Such cage segments may each receive one or more roller members. Furthermore, in place of cage segments, spacers may be provided between the roller members.

In this manner, a compact module comprising the bearing ring with the roller members and the assembly tool can be formed. This module can be inserted as a whole, for example, into an outer ring. The module comprising the bearing ring, roller member and assembly tool can be inserted in a bearing arrangement or also removed from it again.

According to an embodiment, if the bearing ring is a bearing inner ring the sliding elements are arranged in their end position in the free space radially outside the pitch circle diameter between two roller members and the raceway of the outer ring. Alternatively, the bearing ring may be the outer ring, wherein the sliding elements are then arranged in their end position in the free space radially inside the pitch circle diameter between two roller members and the raceway of the inner ring. As a result of this arrangement, it can be ensured that the roller members cannot be removed from the inner ring or the outer ring.

According to another embodiment, the sliding elements can be displaced in an angular manner with respect to the annular face. The sliding elements form in this instance in the end position thereof a frustoconical shape, wherein this frustoconical shape is based on the frustoconical shape which is formed by the roller axes. The diameter of the circle, which is formed by the sliding elements in their starting position, is consequently greater than the diameter of the circle which is formed by the sliding elements in their end position, or vice versa.

According to another embodiment, the assembly tool has a centering element in order to center the ring on the outer diameter of a guide flange of the bearing ring. As a result of the centering element, a precise radial position of the assembly tool with respect to the bearing ring can thus be ensured.

According to another embodiment, the receiving members are constructed as through-openings, in particular as elongate holes. As a result of the construction as elongate holes, it is possible for the sliding elements to be able to be displaced in the peripheral direction. In this manner, a defined adaptation in the peripheral direction of the sliding elements can be enabled in order to compensate for different spacings between the roller members. This different spacing may, for example, be brought about by an accumulation of an initial roller member play in a peripheral direction. As a result of such an elongate hole, a different thermal expansion of the sliding elements and the roller members can further be achieved, particularly when they are produced from different materials. Instead of using an elongate hole, the through-openings may also correspond precisely to the size of the sliding elements.

According to another embodiment, the sliding elements each comprise two pins. The two pins may be connected to each other at one or at both ends by a respective connection element, for example, in the form of a plate. This connection element may be larger than the through-openings in the ring, whereby it may be possible for the sliding elements not to be able to be pulled out of the through-openings and/or to be able to be pushed completely through the through-openings.

According to another embodiment, the assembly tool has a securing element in order to secure the ring to the bearing ring. Such a securing means may, for example, be configured as a clamping or screw device. As a result of such a securing means, securing of the assembly tool on the bearing ring can be ensured. Furthermore, the ring can be secured in a rotating manner on the bearing ring. To this end, for example, rollers may be provided and enable a rotation of the ring with respect to the bearing ring.

According to another embodiment, the assembly tool has a spacing means in order to adjust an axial spacing between the ring and the bearing ring and/or a spacing means in order to adjust a radial spacing between the sliding elements and the raceways of the roller members. The spacing means may, for example, be constructed as adjustable spacing means so that the axial spacing between the ring and the bearing ring and/or the axial spacing between the sliding elements and the raceway of the roller members are adjusted in a variable manner. In this manner, the assembly tool can be used for different sizes of roller members.

According to another embodiment, the assembly tool has a retention element in order to retain the sliding elements in their starting position and/or end position and/or in one or more intermediate positions. Such a retention means may be constructed as a locking element. For example, the retention element may be a pin or a lever, which can be moved by means of a retention plate of the sliding elements in order to retain the sliding elements in their upper or lower position, that is to say, starting or end position. Alternatively, the retention means may be a clamping device, screw device or the like. The retention means may, for example, be constructed as a spring-pretensioned pin. Using such a retention means, it is possible to ensure that the sliding elements are not displaced in an undesirable manner from their starting position into their end position, or vice versa.

According to another embodiment, the ring is produced from a metal and/or the sliding elements are produced from a plastics material or a metal. If the sliding elements are produced from a plastics material, they may be slightly resilient, whereby further adaptation to the roller members or to a radial play or peripheral play of the roller members is possible.

According to another aspect, a method for mounting a bearing having an inner ring and an outer ring is proposed. The method has the steps of: arranging the inner ring, arranging the roller members on the inner ring, arranging the above-described assembly tool on the inner ring, displacing the sliding elements of the assembly tool into their respective end position so that the sliding elements are arranged in each case between two roller members in order to delimit a radial movability of the roller members with respect to the bearing ring (that is to say, to prevent the roller members from falling out), inserting the inner ring with the assembly tool and the roller members onto a sleeve or shaft and/or into the outer ring and removing the assembly tool. The sleeve or shaft may in particular be an element of a hub unit of a turbine.

In order to remove the inner ring from the sleeve or the shaft again, the assembly tool can be fitted to the inner ring again and the sliding elements can be pushed through in order to retain the roller members on the inner ring. The inner ring can then be removed together with the roller members and the assembly tool.

By using of the assembly tool, it is possible to dispense with a single-piece cage since the sliding elements take on the function of a bearing cage so that the roller members are secured between the sliding elements and the bearing ring. The bearing may be constructed to be a full type roller bearing, or individual cage segments can be used. As a result of such an assembly method, it is therefore possible to move a bearing ring with the roller members without a single-piece cage as a whole. This is required particularly for applications with large roller bearings, such as, for example, turbines, as described above.

According to another aspect, a bearing having an inner ring and an outer ring, between which roller members are arranged is proposed. The bearing may in particular be mounted using the above-described mounting method.

According to another aspect, a hub unit for a turbine having two tapered roller bearings which are arranged in an O-shaped arrangement, is proposed, wherein the tapered roller bearings each have an inner ring and an outer ring, between which tapered rollers are arranged in each case. At least one of the tapered roller bearings can be mounted using the above-described mounting method, whereby no single-piece cage is required. Instead, the bearing may be constructed to be a full type roller bearing or may be used with cage segments, as described above in greater detail.

According to another aspect, an assembly tool for a bearing ring having roller members is disclosed. The assembly tool includes a ring having an axial centerline and a first axial end face and a second axial end face and plurality of through openings extending from the first axial end face to the second axial end face and arranged along a periphery of the ring. The second axial end face including an annular shoulder configured to engage the bearing ring, and the assembly tool further includes a plurality of elongated sliders. Each of the sliders is captively and slidably mounted in the respective plurality of through openings at an angle to the axial centerline, and each has a grip portion at a first side of the first axial end face and an end portion at a second axial side of the first axial end face. Furthermore, each of the sliders is shiftable relative to the ring from a first position in which the end portion is spaced a first distance from the first axial end face to a second position in which the end portion is spaced a second distance from the first axial end face, the second distance being less than the first distance.

Other advantages and advantageous embodiments are set out in the description, the drawings and the claims. In this instance, the combinations of features set out in the description and in the drawings are purely exemplary so that the features may also be present individually or combined differently.

The invention is intended to be described in greater detail below with reference to embodiments illustrated in the drawings. In this instance, the embodiments and the combinations shown in the embodiments are purely exemplary and are not intended to determine the protective scope of the invention. This is defined only by the appended claims.

DETAILED DESCRIPTION

Elements which are identical or which have the same function are given the same reference numerals below.

Figure 1:
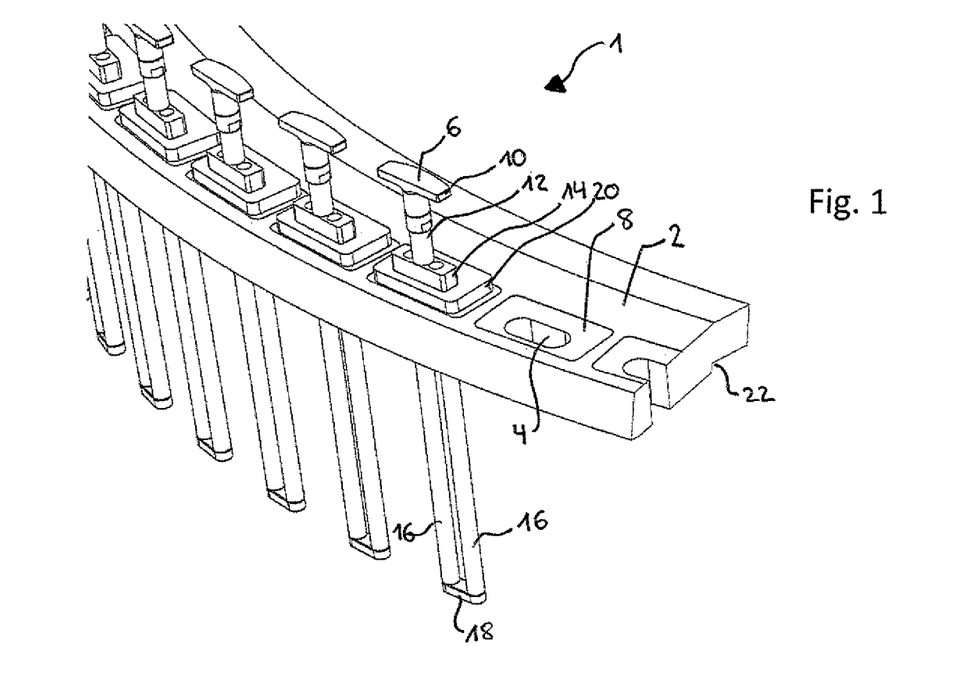
FIG. 1 is a perspective view of an assembly tool according to an embodiment of the disclosure.

FIG. 1 is a perspective view of an assembly tool 1. The assembly tool 1 has a ring 2. The ring includes receiving members or through-openings 4 through which sliding elements 6 can be pushed. The through-openings 4 are preferably elongated in the circumferential direction. In, The sliding elements 6 may be movable these elongated openings 4 in a peripheral direction in order to compensate for a peripheral play between the roller members. The through-openings 4 have support faces 8 on which the sliding elements 6 are placed.

Figure 2:
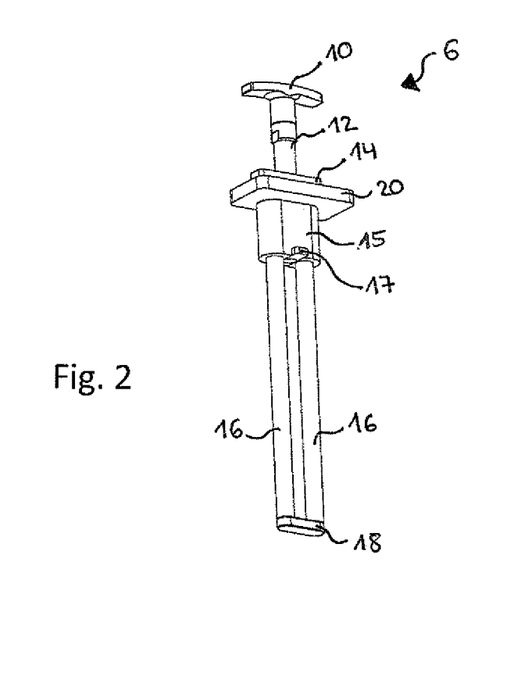
FIG. 2 is a perspective detailed view of a sliding element of the assembly tool of FIG. 1.

The sliding elements 6, which are illustrated in FIG. 2 in detail, comprise a retention handle 10 which is connected to a first tubular portion 12 of the sliding elements 6. The first portion 12 is connected to two pins 16 by means of an intermediate portion 14. The pins 16 are arranged below the ring 2 and can be displaced along the through-openings 4. The sliding elements 6 have at the lower end thereof a connection plate 18. The connection plate 18 serves to connect the two pins 16 to each other at the lower end thereof. At the other, upper end, the two pins 16 are connected to each other by means of the intermediate portion 14.

The intermediate portion 14 serves to define an end position of the sliding elements 6. In this case, the intermediate portion 14 is constructed in such a manner that it has a support plate 20. This support plate 20 is positioned on the support plate 8 of the ring 2 when the sliding elements 6 are pushed into their end position.

Below the support plate 20, the pins 16 of the sliding element 6 extend through an additional element 15. This element 15 may be displaced along the pins 16 and serves to define a starting position of the sliding elements 6. In the starting position, a projection 17 of the element 15 runs into the ring 2 and the sliding elements 6 cannot be pulled further out of the through-openings 4. As a result of the element 15 or the projection 17 thereof, it is possible to determine how far the sliding elements 6 can be pulled out of the ring 2.

In order to fit the assembly tool 1 on a bearing ring, the ring 2 has a centering means 22. The centering means 22, which is constructed as an edge (or shoulder), serves to position the assembly tool 1 on the bearing ring when the centering means 22 is in abutment with an outer side of the bearing ring, for example, a guide flange.

Although, in the Figures, the assembly tool is constructed in such a manner that it can be arranged on an inner ring of a bearing, the assembly tool 1 can also be constructed in such a manner that it can be connected to an outer ring of a bearing.

Figure 3:
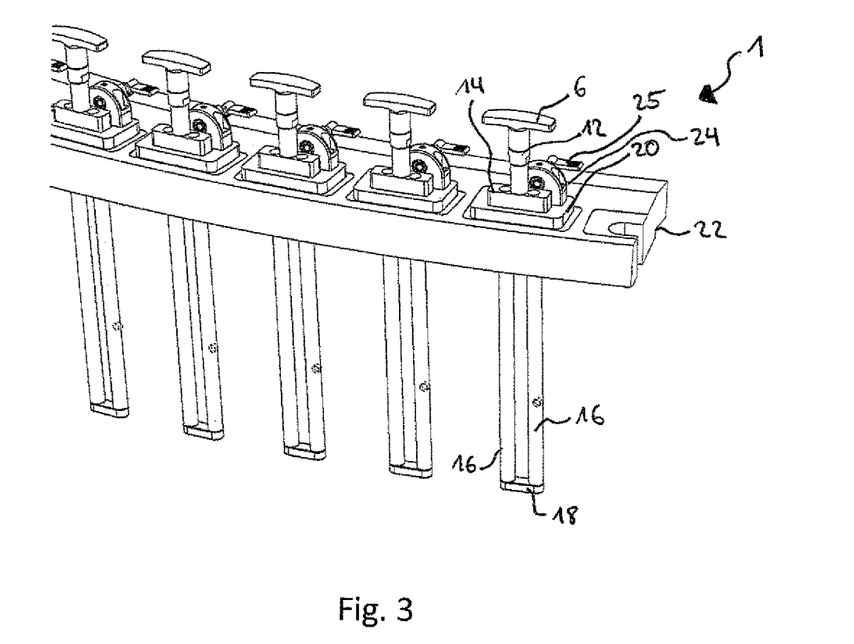
FIG. 3 is another perspective view of the assembly tool of FIG. 1.

FIG. 3 is another perspective view of an assembly tool 1. As shown here, the assembly tool 1 has retention means 24. These retention means 24 serve to lock the sliding elements in their starting and/or end position. The retention means 24 may, for example, each have a latch 25 which engages in the sliding elements 6 in order to retain them in their end position. To this end, the latch 25 can be moved in the end position via the intermediate portion 14 in order to fix the position thereof. The retention means 24 may, for example, be constructed as spring-pretensioned pins which engage in transverse holes in the sliding elements 6, or as balls which engage in grooves in the sliding elements 6.

Figure 4:
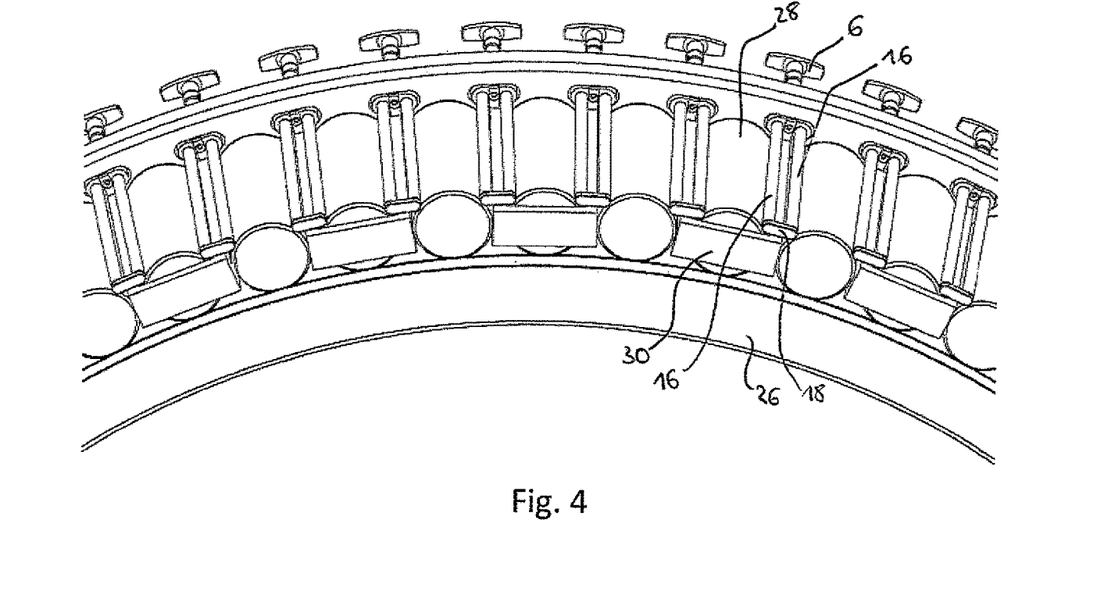
FIG. 4 is a perspective view of an arrangement of the assembly tool of FIG. 1 and a bearing ring.

FIG. 4 is a perspective view of an assembly tool 1 which is arranged on a bearing ring 26. The bearing ring 26 is in this instance an inner ring of a bearing. The inner ring 26 is provided with roller members 28. In the embodiment shown here, the assembly tool 1 is already completely arranged on the bearing ring 26, and the sliding elements 6 are located in their end position. As can be seen here, the sliding elements 6 are arranged in their end position in each case between two roller members 28 of the bearing ring 26. The roller members 28 are in this instance spaced apart by means of cage segments 30. The cage segments 30 are in this instance configured in such a manner that in each case a cage-like segment 30 is arranged around every other roller member 28, wherein a base plate 30 connects two walls or webs of the cage segment 30. The sliding elements 6 are arranged above a pitch circle diameter of the roller members 28 in their end position. In this manner, the sliding elements 6 are configured to retain the roller members 28 in their end position on the bearing ring 26. By using the assembly tool 1, it is possible to dispense with a single-piece cage and instead, as shown here, to use cage segments. Alternatively, the bearing may also be constructed to be a full complement roller bearing. Since the assembly tool 1 takes on the function of a cage and secures the roller members 28 to the bearing ring 26, it is possible to move the bearing ring 26 with the roller members 28 without the roller members 28 falling out.

With reference to FIGS. 5 to 9, an assembly method of a bearing ring 26 using the assembly tool 1 is now described.

Figure 5:
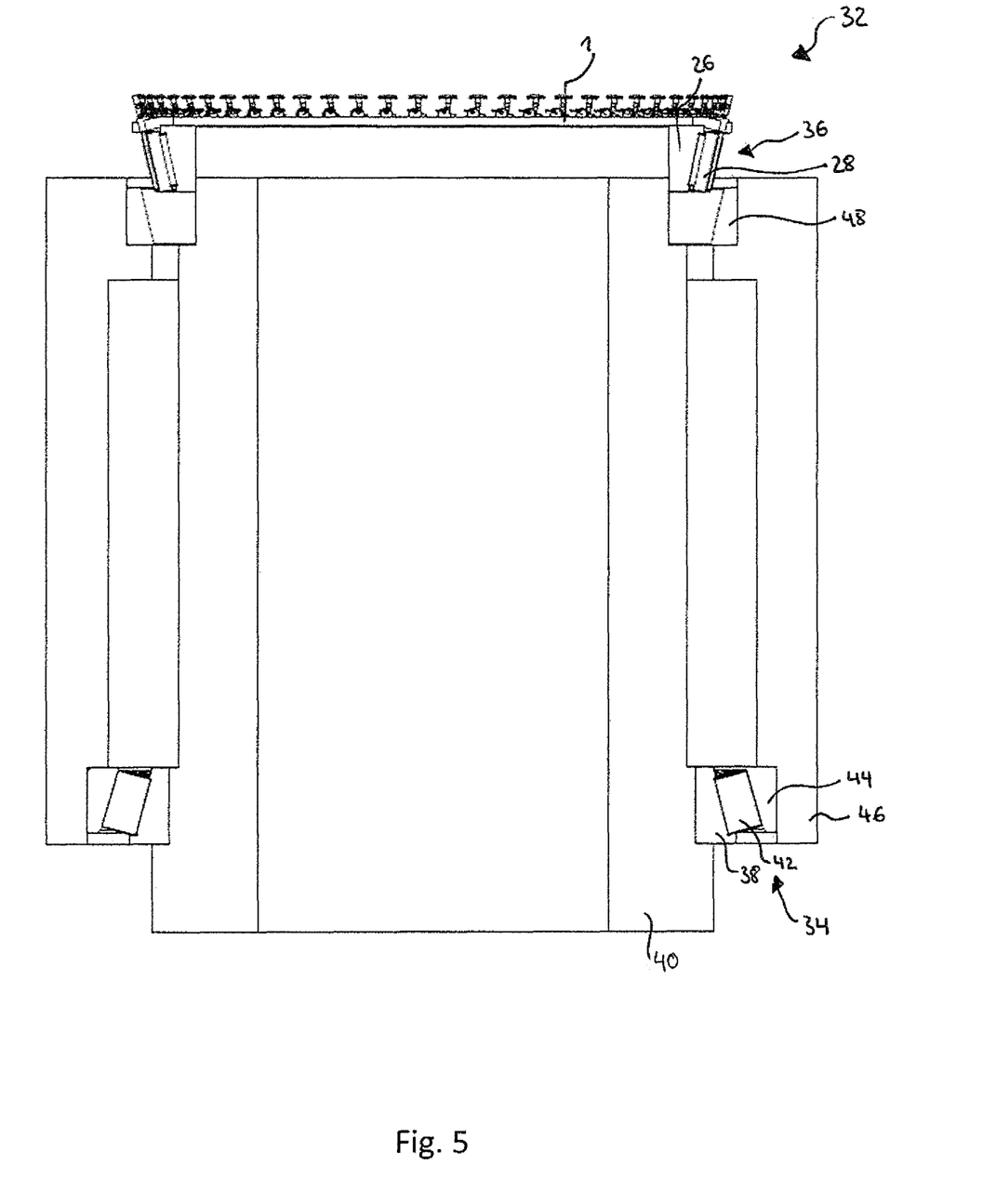
FIG. 5 is a sectional view of a hub unit of a turbine with the assembly tool positioned for use with the hub unit.

The assembly of the bearing ring 26 shown here is the assembly of an inner ring 26 on a sleeve or shaft 32 of a hub unit 32 of a turbine. The hub unit 32 has two tapered roller bearings 34, 36 which are arranged in an O-configuration. The tapered roller bearings 34, 36 are in this instance mounted only from one side on the hub unit 32, that is to say, from the side of the tapered roller bearing 36.

The tapered roller bearing 34 has an inner ring 38, which is fitted to the sleeve or shaft 40. When the tapered roller bearing 34 is mounted, the roller members 42 can be arranged in a simple manner on the inner ring 38 since, as a result of the O-configuration, the roller members 42 cannot fall down. Subsequently, an outer ring 44 is fitted to the roller bearing 34. A housing 46 can subsequently be fitted in order to protect the bearing.

In order to now mount the bearing 36, it is necessary to either rotate the hub unit 32 which, as a result of the size of the hub unit 32 measuring several meters in diameter, is very difficult to carry out. Alternatively, the bearing 36 must also be mounted from above in the same manner as the bearing 34. Since, however, the roller members 28 cannot be fitted to the bearing inner ring 26 in this instance in order to insert them into the outer ring 48 since the roller members in this instance would fall out as a result of gravitational force, it was previously necessary to use a one-piece cage in order to retain the roller member 28 on the bearing ring 26. However, this can be prevented by the assembly tool 1.

As shown in FIGS. 5 to 8, the assembly tool 1 is placed on the bearing ring 26 and the sliding elements 6 are displaced into their end position. As a result of this positioning of the assembly tool 1, the roller members 28 are retained on the bearing ring 26, as described with reference to FIGS. 1 to 3. This module comprising the assembly tool 1, the bearing inner ring 26 and the roller members 28 can now simply be fitted to the sleeve 40. In this instance, the bearing outer ring 48 may already be arranged, as illustrated in FIG. 5.

Figure 6:
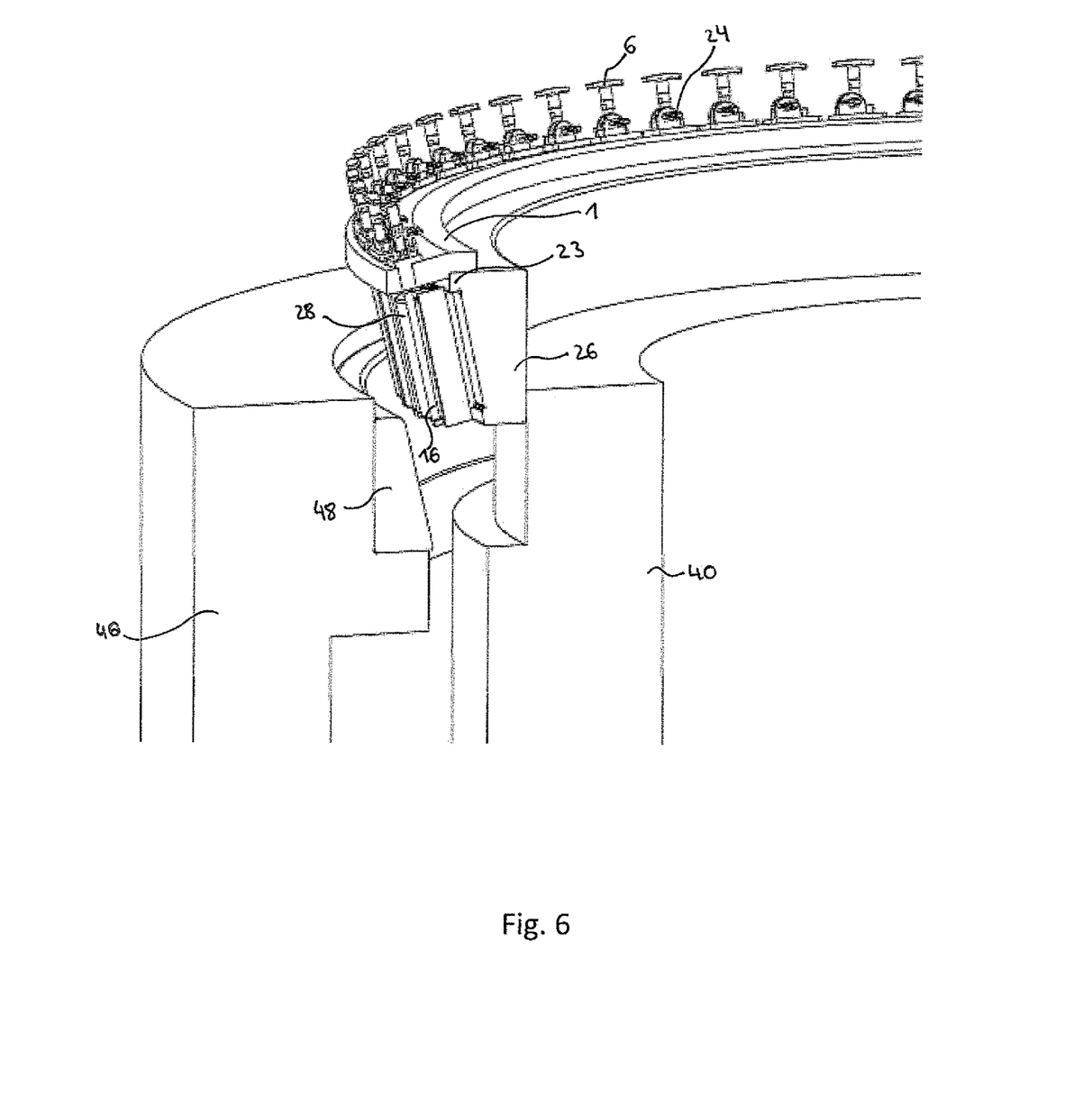
FIG. 6 is a perspective view of a cut-out of the hub unit of FIG. 5.

As shown in FIG. 6, the bearing inner ring 26 may be fitted as a compact module with the roller members 28 and the assembly tool 1 onto the sleeve 40. As shown here, the centering means 22 of the assembly tool 1 abuts a guide flange 23 of the inner ring 26.

Figure 7:
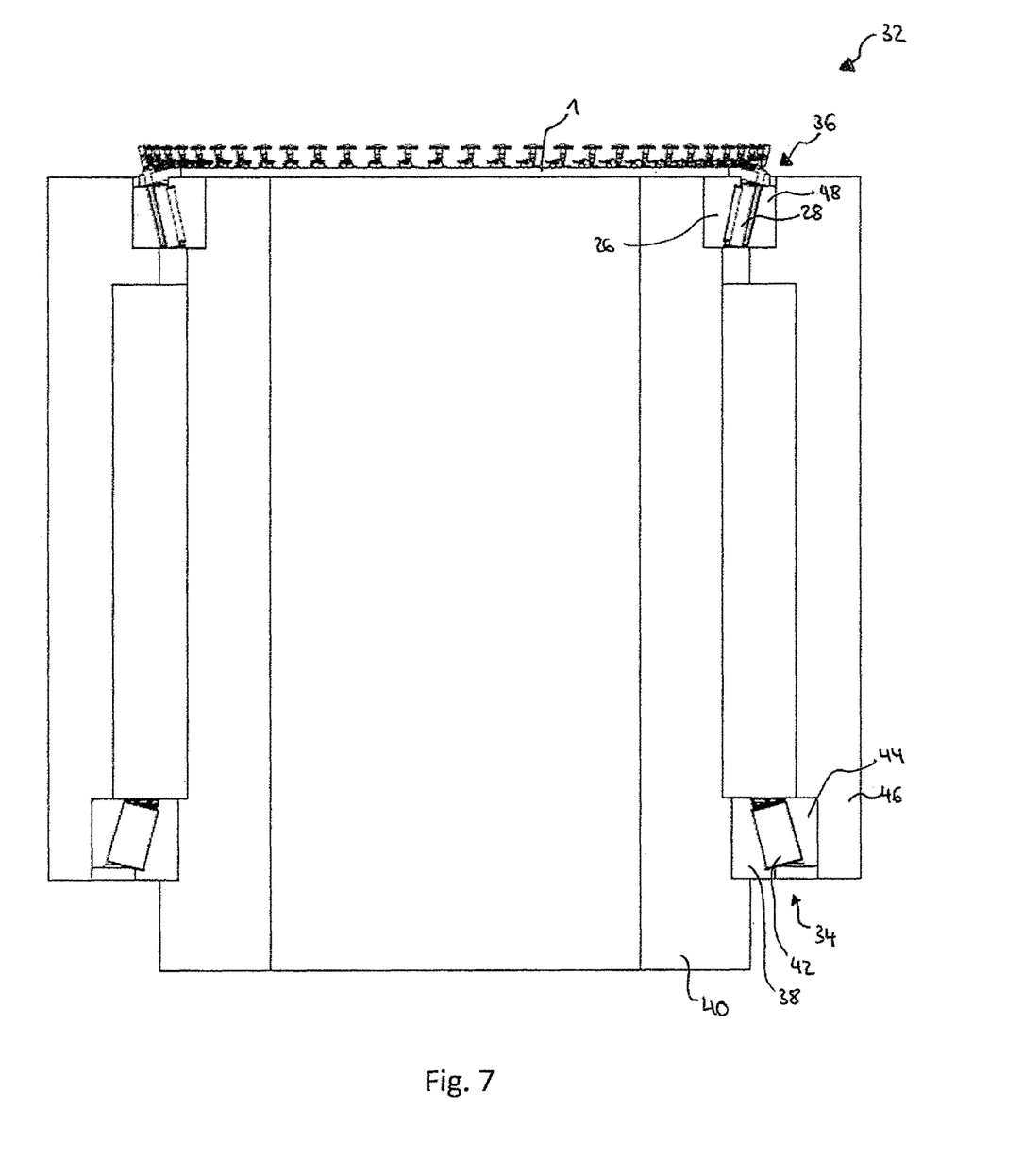
FIG. 7 is a sectional view of the hub unit of FIG. 5 with the bearing inner ring mounted.
Figure 8:
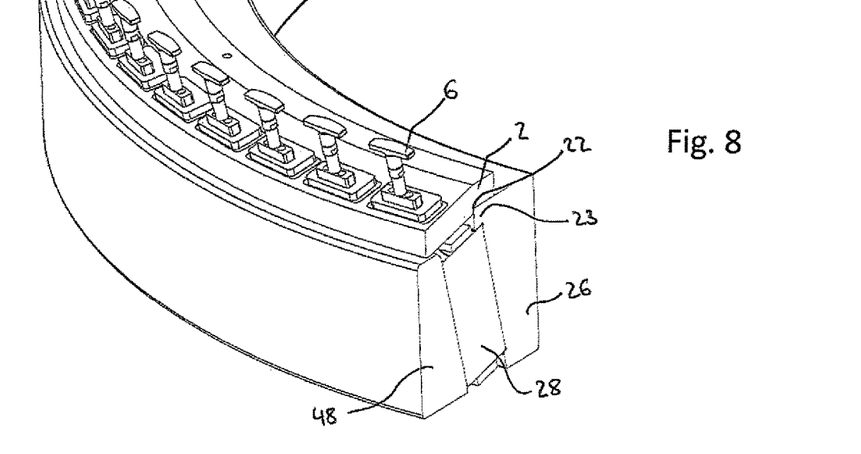
FIG. 8 is a perspective view of a cut-out of the hub unit of FIG. 7.

FIG. 7 shows the end positioning of the module comprising the assembly tool 1, bearing inner ring 26 and roller members 28. FIG. 8 is a perspective view of the end positioning of the assembly tool 1, the bearing inner ring 26, the roller members 28 and the outer ring 48.

Figure 9:
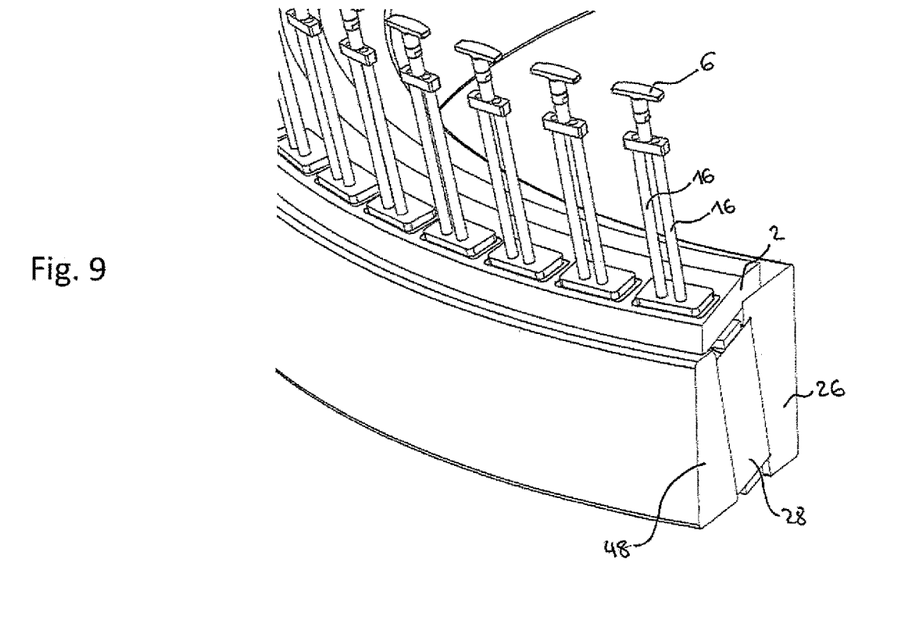
FIG. 9: is a perspective view of the cut-out of the hub unit of FIG. 8 with the sliding elements pulled out.

As soon as the bearing rings 26, 48 and the roller members 28 are positioned correctly, the assembly tool 1 can be removed again. This is illustrated in FIG. 9, in which it is shown how the sliding elements 6 are pulled out of the assembled bearing arrangement. After the sliding elements 6 have been pulled out, the assembly tool 1 can be removed again in a simple manner.

Using the assembly tool shown here, simple assembly of a bearing ring with roller members without using a cage or at least without using a one-piece cage is possible.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assembly tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMERAL LIST

1 Assembly tool
2 Ring
4 Receiving member/through-opening
6 Sliding element
8 Support face
10 Handle
12 First portion
14 Intermediate portion
15 Element
16 Pins
17 Projection
18 Connection plate
20 Support plate
22 Centering means
23 Guide flange
24 Retention means
25 Latch
26 Bearing inner ring
28 Roller member
30 Base plate
32 Hub unit
34 Tapered roller bearing
36 Tapered roller bearing
38 Inner ring
40 Sleeve/shaft
42 Roller member
44 Outer ring
46 Housing
48 Outer ring

What is claimed is:

1. An assembly tool for a bearing ring having roller members, the assembly tool comprising:
 a ring which is constructed to be arranged on a side face of the bearing ring, and sliding elements,
 wherein the ring has receiving members for the sliding elements, and
 wherein the sliding elements are distributed peripherally in a uniform manner around the ring and are configured to be displaced from a starting position into an end position relative to the ring, wherein the sliding elements are configured to be arranged in the end position in each case between two roller members in order to limit a radial movability of the roller members relative to the bearing ring, wherein the ring has an annular face, and wherein the sliding elements are displaceable in an angular manner with respect to the annular face so that the sliding elements in their end position form a frusto-conical shape.

2. The assembly tool according to claim 1, wherein the bearing ring is an inner ring and the sliding elements are arranged in their end position in a free space radially outside a pitch circle diameter between two roller members and the raceway of an outer ring, or wherein the bearing ring is an outer ring and the sliding elements are arranged in their end position in a free space radially inside the pitch circle diameter between two roller members and the raceway of an inner ring.

3. The assembly tool according to claim 1, wherein the receiving members are constructed as elongate holes.

4. The assembly tool according to claim 1, wherein the sliding elements each comprise two pins connected to each other at least at one end.

5. The assembly tool according to claim 1, wherein the assembly tool has a securing means for securing the ring to the bearing ring.

6. The assembly tool according to claim 1, wherein the assembly tool has a spacing means for adjusting an axial spacing between the ring and the bearing ring and/or a spacing means for adjusting a radial spacing between the sliding elements and the raceways of the roller members.

7. The assembly tool according to claim 1, wherein the assembly tool has a retention element in order to retain the sliding elements in their starting position and/or end position and/or one or more intermediate positions.

8. The assembly tool according to claim 1, wherein the ring is produced from a metal and/or wherein the sliding elements are produced from a plastics material and/or a metal.

9. An assembly tool for a bearing ring having roller members, the assembly tool comprising:

a ring which is constructed to be arranged on a side face of the bearing ring, and sliding elements, and a centering element configured to center the ring on the outer diameter of a guide flange of the bearing ring, wherein the ring has receiving members for the sliding elements, wherein the sliding elements are distributed peripherally in a uniform manner around the ring and are configured to be displaced from a starting position into an end position relative to the ring, and wherein the sliding elements are configured to be arranged in the end position in each case between two roller members in order to limit a radial movability of the roller members relative to the bearing ring.

10. The assembly tool according to claim 9, wherein the receiving members are constructed as elongate holes.

11. The assembly tool according to claim 9, wherein the sliding elements each comprise two pins connected to each other at least at one end.

12. The assembly tool according to claim 9, wherein the assembly tool has a securing means for securing the ring to the bearing ring.

13. The assembly tool according to claim 9, wherein the assembly tool has a spacing means for adjusting an axial spacing between the ring and the bearing ring and/or a spacing means for adjusting a radial spacing between the sliding elements and the raceways of the roller members.

14. A method for mounting a bearing having an inner ring and an outer ring, between which roller members are arranged, the method comprising:

arranging the roller members on the inner ring, arranging the assembly tool according to claim 1 on the inner ring, displacing the sliding elements of the assembly tool into their respective end position so that the sliding elements are arranged in each case between two roller members in order to limit a radial movability of the roller members with respect to the bearing ring, inserting the inner ring with the assembly tool and the roller members onto a sleeve or shaft and/or into the outer ring, and removing the assembly tool.

15. An assembly tool for a bearing ring having roller members, the assembly tool comprising:

a ring having an axial centerline and a first axial end face and a second axial end face and plurality of through openings extending from the first axial end face to the second axial end face and arranged along a periphery of the ring, the second axial end face including an annular shoulder configured to engage the bearing ring, and a plurality of elongated sliders, each of the sliders being captively and slidably mounted in the respective plurality of through openings at an angle to the axial centerline, each of the plurality of sliders having a grip portion at a first side of the first axial end face and an end portion at a second axial side of the first axial end face, wherein each of the sliders is shiftable relative to the ring from a first position in which the end portion is spaced a first distance from the first axial end face to a second position in which the end portion is spaced a second distance from the first axial end face, the second distance being less than the first distance.

16. The assembly tool according to claim 15, wherein the sliders each comprise a first rod and a second rod separated by a gap, the end portion comprising a connecting plate connecting an end of the first rod to an end of the second rod.

17. The assembly tool according to claim 16, wherein each of the sliders includes a plate portion configured to cover a first one of the through openings and a plug portion configured to be received in the first one of the through openings, the first and second rods extending from the plug portion.

18. An installation unit comprising:

a bearing ring, the assembly tool according to claim 15 mounted on the bearing ring with the annular shoulder engaging an annular edge of the bearing ring, and a plurality of rollers held against the bearing ring by the plurality of sliders, wherein one slider of the plurality of sliders is located between each adjacent pair of the rollers.

19. A method for mounting a bearing having an inner ring and an outer ring, between which roller members are arranged, the method comprising:

arranging the roller members on the inner ring, arranging the assembly tool according to claim 9 on the inner ring, displacing the sliding elements of the assembly tool into their respective end position so that the sliding elements are arranged in each case between two roller members in order to limit a radial movability of the roller members with respect to the bearing ring,
inserting the inner ring with the assembly tool and the roller members onto a sleeve or shaft and/or into the outer ring, and
removing the assembly tool.

* * * * *